(12) United States Patent
Uyama et al.

(10) Patent No.: US 8,058,470 B2
(45) Date of Patent: Nov. 15, 2011

(54) POLYESTER POLYOL

(75) Inventors: Hiroshi Uyama, Osaka (JP); Yinan Yin, Osaka (JP); Takashi Tsujimoto, Osaka (JP); Hideo Noda, Hyogo (JP); Takahiko Terada, Hyogo (JP)

(73) Assignees: Bio-Energy Corporation (JP); Osaka University (JP); Kansai Chemical Engineering Co., Ltd. (JP)

( * ) Notice: Subject to any disclaimer, the term of this patent is extended or adjusted under 35 U.S.C. 154(b) by 254 days.

(21) Appl. No.: 12/439,765

(22) PCT Filed: Mar. 8, 2007

(86) PCT No.: PCT/JP2007/055167
§ 371 (c)(1),
(2), (4) Date: May 6, 2009

(87) PCT Pub. No.: WO2008/029527
PCT Pub. Date: Mar. 13, 2008

(65) Prior Publication Data
US 2010/0016628 A1 Jan. 21, 2010

(30) Foreign Application Priority Data
Sep. 4, 2006 (JP) .................. 2006-238723

(51) Int. Cl.
*C07C 69/66* (2006.01)
*C08G 18/72* (2006.01)
*C08L 67/00* (2006.01)

(52) U.S. Cl. .......... 560/182; 528/67; 528/271; 528/361; 525/411; 525/412; 525/413; 521/142; 521/172

(58) Field of Classification Search ................. None
See application file for complete search history.

(56) References Cited

U.S. PATENT DOCUMENTS

| | | |
|---|---|---|
| 5,225,521 A | 7/1993 | Spinu |
| 5,359,026 A | 10/1994 | Gruber |
| 5,371,176 A | 12/1994 | Bezwada et al. |
| 5,434,241 A | 7/1995 | Kim et al. |
| 5,618,911 A | 4/1997 | Kimura et al. |
| 5,922,682 A | 7/1999 | Brich et al. |

FOREIGN PATENT DOCUMENTS

| | | |
|---|---|---|
| CA | 1260488 A1 | 9/1989 |
| JP | 60076531 A | 5/1985 |

(Continued)

OTHER PUBLICATIONS

JP 2003238931, Fukunaga, Shinichi, English abstract, 2 pages.*

(Continued)

*Primary Examiner* — Porfirio Nazario Gonzalez
*Assistant Examiner* — Yate K Cutliff
(74) *Attorney, Agent, or Firm* — The Webb Law Firm

(57) ABSTRACT

A star-branched polyester polyol is obtained by polymerizing lactide or lactic acid, using, as an initiator, a fat and oil composed mainly of a triacylglycerol that has at least three hydroxyl groups or epoxy groups in its molecule. This polyester polyol has low crystallinity and a low melting point, and thus shows good working properties when used in various applications. Furthermore, this polyester polyol is derived from renewable resources, and, thus, it is highly desirable in view of its effectiveness in protecting the global environment and preventing fossil resources from being depleted.

12 Claims, 2 Drawing Sheets

FOREIGN PATENT DOCUMENTS

| | | |
|---|---|---|
| JP | 5039347 A | 2/1993 |
| JP | 6313032 A | 11/1994 |
| JP | 6340732 A | 12/1994 |
| JP | 7292082 A | 11/1995 |
| JP | 7309862 A | 11/1995 |
| JP | 8057949 A | 3/1996 |
| JP | 8100057 A | 4/1996 |
| JP | 8506848 T | 7/1996 |
| JP | 9501456 T | 2/1997 |
| JP | 10265656 A | 10/1998 |
| JP | 11043538 A | 2/1999 |
| JP | 11255870 A | 9/1999 |
| JP | 2001151871 A | 6/2001 |
| JP | 2002348366 A | 12/2002 |
| JP | 2003003057 A | 1/2003 |
| JP | 2003039620 A | 2/2003 |
| JP | 2003238931 * | 8/2003 |
| JP | 2003253107 A | 9/2003 |

OTHER PUBLICATIONS

JP 2003-23891, Fukunaga, S, Biodegradable Adhesive, English Translation, (6 pages).*

Database WPI Week XP-002607886 re JP2003-253107.

* cited by examiner

POLYESTER POLYOL

TECHNICAL FIELD

The present invention relates to a polyester polyol, and specifically to a polyester polyol that has a low crystallinity and a low melting point that can be produced from renewable resources.

BACKGROUND ART

Polyurethane has high elasticity and flexibility, and is excellent in abrasion resistance and the like. Thus, it is used in many fields such as foams, elastomers, adhesives, and coatings. Polyurethane is synthesized mainly from polyisocyanate and polyol. As a polyol, polypropylene glycol (PPG) or an ethylene oxide-modified form thereof is most frequently used. The reasons for this are not only that these substances are inexpensive, but also that they can be handled very easily due to their liquid form having low viscosity at room temperature.

However, PPG does not have sufficient thermal resistance, weather resistance, mechanical characteristics, and the like. Thus, when these characteristics are required, a polyester polyol is used. Examples of a polyester polyol include: adipate-based polyester polyols, such as polyester polyol synthesized from ethylene glycol and adipic acid, and polyester polyol synthesized from 1,4-butylene glycol and adipic acid; and polycaprolactone-based polyester polyol obtained by using ε-caprolactone as a raw material (Japanese Laid-Open Patent Publication No. 2003-3057, for example).

Furthermore, polyester polyol is used not only as a raw material for polyurethane but also as a raw material for plasticizers, resin modifiers, and polyester or epoxy resin coatings (Japanese Laid-Open Patent Publication No. 10-265656, for example).

However, in general, a polyester polyol having a molecular weight of 1000 or more is a wax-like solid at room temperature because its melting point is 40 to 60° C. Thus, it is difficult to use such a polyester polyol in the case where a liquid form is required. Furthermore, the viscosity of the molten state is high, and, thus, working properties is extremely poor.

Disclosed examples of biodegradable polyester polyol include: lactic acid-modified polyol obtained by ring-opening copolymerization of lactides and alkylene oxide having 2 to 16 carbon atoms to a compound having two or more active hydrogen atoms in its molecule; and lactic acid-modified polyol obtained by addition polymerization of an alkylene oxide having two or more carbon atoms to a polylactic acid having a number average molecular weight of 100 to 2500 (Japanese Laid-Open Patent Publication No. 11-43538). Polyurethane or epoxy resin obtained from this polyester polyol exerts excellent biodegradability without impairing mechanical strength.

Polylactic acid obtained by polymerizing lactide or lactic acid is polyester made from renewable resources. However, due to its high crystallinity and high melting point, this polylactic acid has a problem in that the working properties is poor when used in various applications such as a raw material for resins and coatings.

SUMMARY OF THE INVENTION

It is an object of the present invention to provide a polyester polyol that has a low melting point to realize good working properties and that is excellent in various characteristics.

The present invention is based on the findings that a polyester polyol having a very low melting point or having no melting point can be produced when a star-branched polymer having a plurality of polylactic acid branched chains is formed by polymerizing lactide and lactic acid using, as an initiator, a fat and oil having a plurality of hydroxyl groups or epoxy groups in its molecule.

The present invention provides a polyester polyol having at least three branched chains composed of polylactic acid in its molecule.

In one embodiment, the polyester polyol is obtained by either one of steps:

(a) performing ring-opening polymerization of lactide; or (b) performing dehydration-condensation polymerization of lactic acid;

wherein a fat and oil composed mainly of a triacylglycerol that has at least three hydroxyl groups in its molecule is used as an initiator.

In an embodiment, the fat and oil is a castor oil, a polycastor oil, or a hydroxylated soybean oil.

In another embodiment, the lactide or the lactic acid is in DL-form (racemic form).

In a further embodiment, the lactide or the lactic acid is in L-form or D-form, and in the step (a) or (b), the lactide or the lactic acid is contained in a ratio of 200 parts by weight or less with respect to 100 parts by weight of the initiator.

In a separate embodiment, the polyester polyol is obtained by either one of steps:

(c) performing ring-opening polymerization of lactide; or (d) performing dehydration-condensation polymerization of lactic acid;

wherein a fat and oil composed mainly of a triacylglycerol that has at least three epoxy groups in its molecule is used as an initiator.

In an embodiment, the fat and oil is an epoxidized soybean oil, an epoxidized palm oil, or an epoxidized linseed oil.

In another embodiment, the lactide or the lactic acid is in L-form or D-form, and in the step (c) or (d), the lactide or the lactic acid is contained in a ratio of 950 parts by weight or less with respect to 100 parts by weight of the initiator.

In another embodiment, in the step (c) or (d), the lactide or the lactic acid is in DL-form (racemic form).

In another embodiment, the steps (c) and (d) are respectively steps of:

(c') after synthesizing a denatured fat and oil derived from the lactide or the lactic acid by adding the lactide or the lactic acid to the fat and oil, then performing ring-opening polymerization of the lactide, and (d') after synthesizing a denatured fat and oil derived from the lactide or the lactic acid by adding the lactide or the lactic acid to the fat and oil, then performing dehydration-condensation polymerization of the lactic acid.

In another embodiment, the step (c) or (d) is a step of obtaining polylactic acid by polymerizing the lactide or the lactic acid alone and then adding the polylactic acid to the fat and oil.

In a further embodiment, in the step (d), the lactic acid is a lactic acid fermentation liquor; and after the step (d), a step (e) of separating and collecting an oil layer from the lactic acid fermentation liquor obtained in the step (d) is performed.

In an embodiment, in the step (e), water is added to the lactic acid fermentation liquor obtained in the step (d).

In a separate embodiment, the polyester polyol is amorphous.

The present invention also provides a polyurethane obtained by a step of reacting the polyester polyol with polyisocyanate.

The polyester polyol of the present invention has low crystallinity and a low melting point. Thus, its working properties when used in various applications such as a raw material for resins and coatings is good. Furthermore, the polyester polyol of the present invention is made from polylactic acid chains and a fat and oil that are both renewable resources, and, thus, it is highly excellent in view of its effectiveness in protecting the global environment and preventing fossil resources from being depleted.

BEST MODE FOR CARRYING OUT THE INVENTION

Polyester Polyol

Figure 1:
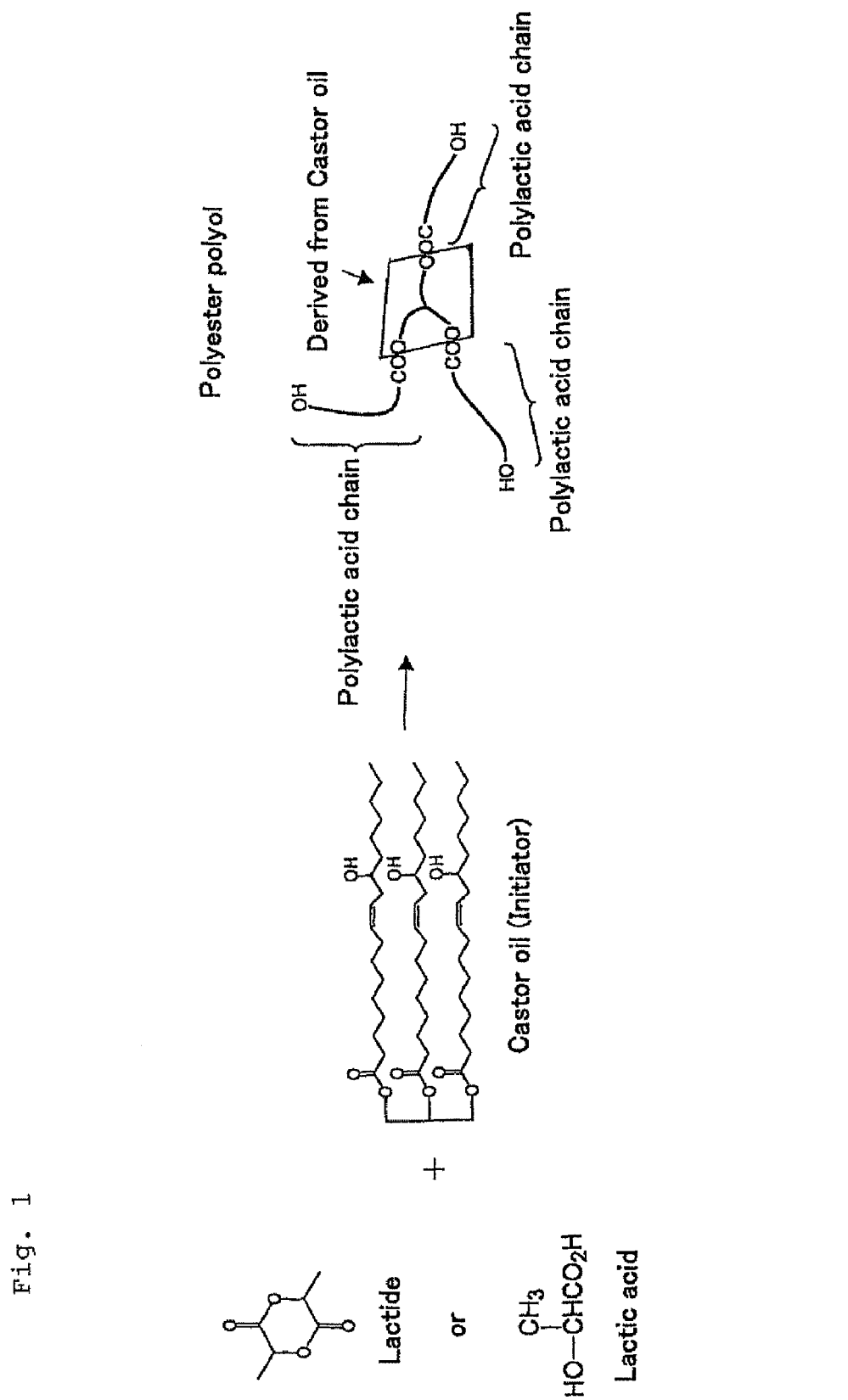
FIG. 1 is a schematic diagram showing an embodiment of the synthesis and structure of the polyester polyol of the present invention.
Figure 2:
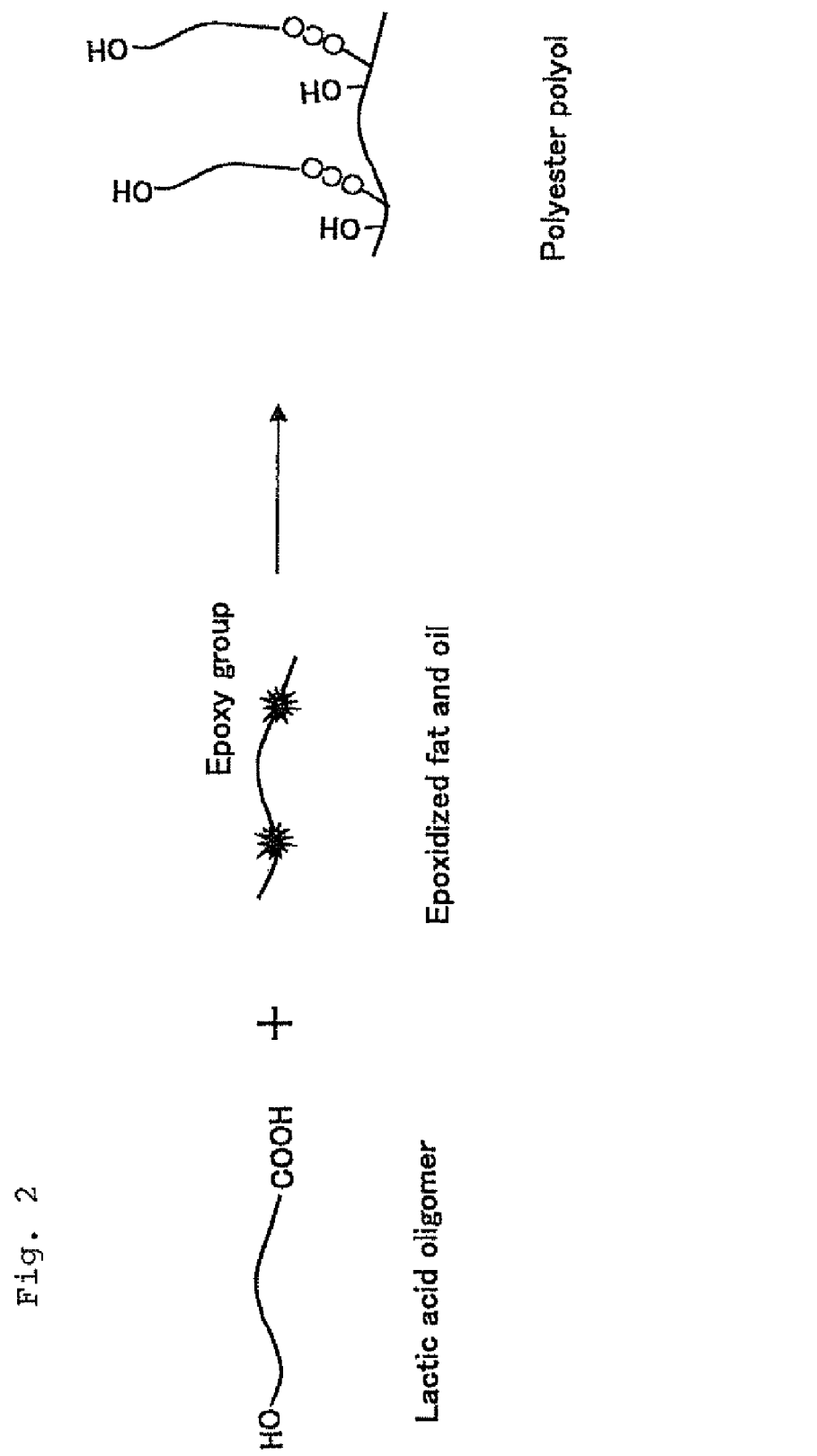
FIG. 2 is a schematic diagram showing another embodiment of the synthesis and structure of the polyester polyol of the present invention.

The polyester polyol of the present invention is designed to have a low melting point and to be made from renewable resources. That is to say, the polyester polyol of the present invention is a star-branched polymer having at least three branched chains (that is, polylactic acid chains or lactic acid oligomer chains) in its molecule, in which lactic acid functions as the structural unit (see FIGS. 1 and 2). More specifically, in a fat and oil (triacylglycerol) having at least three hydroxyl groups in its molecule, the hydroxyl groups are respectively bonded via ester bonds to the carboxy termini of polylactic acids (FIG. 1). Alternately, in a fat and oil (triacylglycerol) having at least three epoxy groups in its molecule, the epoxy rings are opened and respectively bonded via ester bonds to the carboxy termini of polylactic acids (FIG. 2). Thus, at least three polylactic acid chains extend from a fat and oil that functions as an origin, and hydroxyl groups are present at the termini of the respective polylactic acid chains. The glass transition temperature, the melting point, and the degree of crystallinity of such polyester polyols are lower than those of other polyester polyols such as polyethylene adipate or polybutylene adipate, even those having similar molecular weights. The polyester polyol may be amorphous depending on the structure of the fat and oil and the polylactic acid chains.

The polyester polyols can be obtained by either one of steps: (a) ring-opening polymerization of lactide or (b) dehydration-condensation polymerization of lactic acid, for example, using, as an initiator, a fat and oil composed mainly of a triacylglycerol that has at least three hydroxyl groups in its molecule. Alternately, the polyester polyol can be obtained by either one of steps: (c) ring-opening polymerization of lactide or (d) dehydration-condensation polymerization of lactic acid, using, as an initiator, a fat and oil composed mainly of a triacylglycerol that has at least three epoxy groups in its molecule.

Initiator

The fat and oil used as the initiator is composed mainly of a triacylglycerol having at least three hydroxyl groups in its molecule, or a triacylglycerol having at least three epoxy groups in its molecule. Hereinafter, these fats and oils may be respectively referred to as a hydroxylated fat and oil and an epoxidized fat and oil.

In the present invention, a fat and oil refers to an ester of a fatty acid having many carbon atoms (higher fatty acid) and glycerin. Fatty oils such as salad oil and soybean oil, which are in a liquid form at room temperature, and fats such as lard and beef tallow, which are in a solid form, are collectively referred to as a fat and oil. In the present invention, a fat and oil derived from naturally-occurring products is preferable because it is a renewable resource. Such a fat and oil can be obtained by means usually used by a person skilled in the art. For example, the fat and oil can be obtained using a method in which a raw material such as beans or seeds is subjected to pretreatment such as threshing, pulverization, and steaming (heat treatment); an oil is obtained from the resultant by rendering, pressing, or extraction; and then the oil is subjected to a purification treatment such as degumming, deoxidization, decolorization, and deodorization.

The fat and oil has various characteristics depending on the type of fatty acid as a constituent. In the present invention, a fat and oil composed mainly of a triacylglycerol having many hydroxyl groups that may function as origins is preferable as the initiator. Examples of the fat and oil include corn oil, sesame oil, peanut oil, kapok oil, and castor oil.

Castor oil is a vegetable oil obtained from the seeds of *Ricinus communis* belonging to the euphorbia family, and approximately 90% of the constituent fatty acid is ricinoleic acid that is a type of unsaturated fatty acid and has hydroxyl groups. While many of fats and oils have a hydroxyl value of 10 mgKOH/g, castor oil has a hydroxyl value as high as 155 to 177 mgKOH/g. Thus, castor oil is preferable as the initiator.

Polycastor oil is polymerized castor oil. Unsaturated bonds (C=C) derived from ricinoleic acid in the castor oil molecules are radically polymerized using organic peroxides or the like as an initiator, thereby forming polycastor oil. Polycastor oil has a structure with more branched portions than castor oil, and the number of hydroxyl groups in such a fat and oil molecule is larger than that of castor oil. That is to say, polycastor oil has more hydroxyl groups that may function as origins of polymerization, and has a structure with more branched portions. Thus, polycastor oil is more preferable as the initiator in the production of the polyester polyol of the present invention.

Alternately, a hydroxylated fat and oil obtained by introducing hydroxyl groups into carbon-carbon unsaturated bonds in unsaturated fatty acids such as linoleic acid or oleic acid also can be used as the initiator of the polyester polyol of the present invention. Examples of the hydroxylated fat and oil include hydroxylated soybean oil, hydroxylated linseed oil, hydroxylated rapeseed oil, hydroxylated palm oil, and hydroxylated corn oil.

Furthermore, in the present invention, a fat and oil composed mainly of a triacylglycerol having many epoxy groups that may function as origins is also preferable as the initiator. An epoxidized fat and oil obtained by introducing epoxy groups into carbon-carbon unsaturated bonds derived from unsaturated fatty acids such as linoleic acid or oleic acid can be used as the initiator of the polyester polyol of the present invention. Examples of the epoxidized fat and oil include epoxidized soybean oil, epoxidized linseed oil, and epoxidized palm oil. These epoxidized fats and oils are used industrially as an additive for resins such as vinyl chloride resin for providing plasticity and other properties.

In the above-described fat and oil having hydroxyl groups or epoxy groups, a hardened oil in which unsaturated groups of the constituent fatty acid have been changed into saturated fatty acids by hydrogenation also can be used. By using the hardened oil, the resulting polyester polyol has increased stability against heat and improved solubility so as to be miscible with substances such as rosin, waxes, rubbers, and polyethylene. Furthermore, when blended with another wax, the solvent resistance, the grease resistance, and the hardness of the resulting polyester polyol can be improved.

The fat and oil used as the initiator may be a mixture of fats and oils having different fatty acids, or may contain, as impurities, a fat and oil having less than three hydroxyl groups or epoxy groups in its molecule. In many cases, a fat and oil is not a pure substance but a mixture, and, thus, any fat and oil may be used, as long as it is composed mainly of a fat and oil having at least three hydroxyl groups or epoxy groups in its molecule. The content of the fat and oil having at least three hydroxyl groups or epoxy groups in the fat and oil used as the initiator is preferably 50 wt % or more, more preferably 70 wt % or more. If the content is less than 50 wt %, then linear polyester polyol is frequently formed, so that the glass transition temperature, the melting point, and the degree of crystallinity become high.

Lactide and Lactic Acid

Polylactic acid constituting branched chains in a star-branched polymer, which is one of characteristics of the polyester polyol of the present invention, is formed by polymerizing lactide or lactic acid.

Lactic acid can be obtained by fermenting carbon sources such as glucose that can be assimilated using microorganisms such as lactic acid bacteria. Glucose as a carbon source can be obtained by any means as in the petroleum industry, but also can be produced by hydrolyzing many renewable resources such as cellulose and starch. Accordingly, lactic acid is also a renewable resource. In the present invention, a lactic acid fermentation liquor may be used without any treatment, lactic acid isolated from a lactic acid fermentation liquor may be used, or commercially available lactic acid may be used.

In the present invention, lactide refers to the cyclic diester obtained by dehydration-condensation of two lactic acid molecules. Accordingly, lactide is a renewable resource. In the present invention, commercially available lactide may be used.

There are optical isomers in lactic acid and lactide. In many cases, only the L-form lactic acid is obtained by lactic acid bacteria fermentation. However, some microorganisms (e.g., *Lactobacillus lactis, Lactobacillus bulgaricus, Leuconostoc cremoris*) produce the D-form lactic acid. When several types of microorganisms containing such microorganisms are mixed and subjected to fermentation, lactic acid in DL-form (racemic form) can be obtained. Furthermore, lactic acid in DL-form can be obtained by racemizing L-lactic acid using microorganisms that produce lactate racemase.

Production of Polyester Polyol by Ring-Opening Polymerization of Lactide

Lactide has a structure in which two lactic acid molecules are cyclized together. Thus, polylactic acid chains can be formed by ring-opening polymerization of lactide. Polyester polyol having polylactic acid chains that are formed by ring-opening polymerization of lactide using an initiator as an origin can be produced, for example, by placing lactide and an initiator (hydroxylated fat and oil or epoxidized fat and oil) in a sufficiently dried vessel, purging the vessel with an inert gas, adding a catalyst, and then heating the mixture while stirring.

In the case where an epoxidized fat and oil is used as the initiator, a lactide may be subjected to ring-opening polymerization after a denatured fat and oil having the lactide is synthesized by an addition reaction of the lactide with the fat and oil, or a polylactic acid obtained by polymerizing lactide alone may be subjected to an addition reaction with the fat and oil.

In the case where the lactide is L-lactide or D-lactide, the mixing ratio of the hydroxylated fat and oil that functions as the initiator to the lactide is preferably approximately 1/50 or less, and more preferably 1/10 or less, in terms of molar ratio (fat and oil/lactide). The weight ratio is such that the lactide is contained in a ratio of 160 parts by weight or less, with respect to 100 parts by weight of the initiator. If the lactide is contained in a ratio of more than 160 parts by weight, polylactic acid chains that are branched become long, the characteristics of polylactic acid tend to be exhibited, so that the crystallinity increases. If the crystallinity increases, then the melting point becomes higher, and thus working properties in various aspects becomes poor. There are problems, for example, in that the crystallinity is high, the miscibility with a solvent or another compound is poor, the melting point is high, and heating is necessary for melting.

In this case, the L-lactide or D-lactide may contain each optical isomer as impurities, but the optical purity may be 84 mol % or more.

In the case where the lactide is in DL-form (racemic form), the mixing ratio of the lactide to the hydroxylated fat and oil that functions as the initiator is such that the lactide is contained in a ratio of preferably 750 parts by weight or less, more preferably 350 parts by weight or less, with respect to 100 parts by weight of the initiator. In the case where the lactide is in DL-form, since the crystallinity of the polylactic acid chains that are branched is originally low, even if the lactide is contained in a ratio of 750 parts by weight with respect to 100 parts by weight of the initiator, the resulting polyester polyol has no melting point. However, if the lactide is contained in a ratio of more than 750 parts by weight with respect to 100 parts by weight of the initiator, the molecular weight of the resulting polyester polyol also increases. Thus, the number of hydroxyl groups per molecule (hydroxyl value) becomes small, and this polyester polyol may not be suitable for applications such as a raw material for polyurethane, in which the characteristics of a polyol are required, Furthermore, if the lactide is contained in a ratio of more than 350 parts by weight, the molecular weight of the resulting polyester polyol is more than 4000, soft segments that constitute polyurethane molecules become longer, so that the hardness of the resulting polyurethane may be lowered.

In the case where the lactide is L-lactide or D-lactide, the mixing ratio of the epoxidized fat and oil that functions as the initiator to the lactide is preferably approximately 1/50 or less, and more preferably 1/20 or less, in terms of molar ratio (fat and oil/lactide). The weight ratio is such that the lactide is contained in a ratio of preferably 760 parts by weight or less, more preferably 300 parts by weight or less, with respect to 100 parts by weight of the initiator. If the lactide is contained in a ratio of more than 760 parts by weight, polylactic acid chains that are branched become long, the characteristics of polylactic acid tend to be exhibited, so that the crystallinity increases. When the crystallinity increases, the melting point becomes higher, and thus working properties in various aspects becomes poor. There are problems, for example, in that the crystallinity is high, the miscibility with a solvent or another compound is poor, the melting point is high, and heating is necessary for melting. If the lactide is contained in a ratio of 760 parts by weight or less, then the resulting polyester polyol is amorphous. However, if the lactide is contained in a ratio of more than 760 parts by weight, with respect to 100 parts by weight of the initiator, then the molecular weight of the resulting polyester polyol also increases. Thus, the number of hydroxyl groups per molecule (hydroxyl value) becomes small, and this polyester polyol may not be suitable for applications such as a raw material for polyurethane, in which the characteristics of a polyol are required. Furthermore, if the lactide is contained in a ratio of more than 300 parts by weight, then the molecular weight of the resulting polyester polyol is more than 4000, soft segments that constitute polyurethane molecules become longer, so that the hardness of the resulting polyurethane may be lowered.

In this case, the L-lactide or D-lactide may contain each optical isomer as impurities, but the optical purity may be 84 mol % or more.

In the case where the lactide is in DL-form (racemic form), the mixing ratio of the lactide to the epoxidized fat and oil that functions as the initiator is such that the lactide is contained in a ratio of preferably 760 parts by weight or less, more preferably 300 parts by weight or less, with respect to 100 parts by weight of the initiator. In the case where the lactide is in DL-form, since the crystallinity of the polylactic acid chains that are branched is originally low, even if the lactide is contained in a ratio of 760 parts by weight with respect to 100 parts by weight of the initiator, the resulting polyester polyol has no melting point. However, if the lactide is contained in a ratio of more than 760 parts by weight with respect to 100 parts by weight of the initiator, then the molecular weight of the resulting polyester polyol also increases. Thus, the number of hydroxyl groups per molecule (hydroxyl value) becomes small, and this polyester polyol may not be suitable for applications such as a raw material for polyurethane, in which the characteristics of a polyol are required. Furthermore, if the lactide is contained in a ratio of more than 300 parts by weight, then the molecular weight of the resulting polyester polyol is more than 4000, soft segments that constitute polyurethane molecules become longer, so that the hardness of the resulting polyurethane may be lowered.

As a catalyst in the polymerization of the lactide, it is possible to use catalysts usually used by a person skilled in the art. Specific examples of the catalyst include porphyrin aluminum complexes, $(n-C_4H_9O)_4Al_2O_2Zn$, composite metal cyanide complexes, tin dichloride ($SnCl_2$), tin 2-ethylhexanoate, aqueous diethylzinc or diethylcadmium, aluminum triisopropoxide, titanium tetrabutoxide, zirconium tetrapropoxide, tributyltin methoxide, tetraphenyltin, lead oxide, zinc stearate, bismuth 2-ethylhexanoate, potassium alcoholate, and antimony fluoride. Industrial examples thereof include stannous octanoate. In view of yield, tin dichloride ($SnCl_2$) and tin 2-ethylhexanoate are particularly preferable.

There is no particular limitation on the amount of catalyst used. The amount is suitably approximately 0.0001 to 5 parts by weight, preferably approximately 0.05 to 1 part by weight, with respect to 100 parts by weight of the lactide.

There is no particular limitation on the inert gas. Examples thereof include nitrogen gas and argon gas.

The above-described polymerization reaction can be performed at room temperature, but is performed with heating if necessary. Heating is performed preferably at 100 to 180° C., more preferably at 120 to 160° C. If the temperature is lower than 100° C., the reaction rate is low, which is not preferable. On the other hand, if the temperature is higher than 180° C., there are problems, for example, in that the degradation rate is increased and low-molecular weight components vaporize.

Production of Polyester Polyol by Dehydration-Condensation Polymerization of Lactic Acid Lactic acid is a compound that has a carboxyl group and a hydroxyl group in one molecule. Thus, polylactic acid chains can be formed by condensation polymerization of lactic acid. Polyester polyols having polylactic acid chains that are formed by condensation polymerization of lactic acid using an initiator as an origin can be produced, for example, by placing lactic acid and an initiator (hydroxylated fat and oil or epoxidized fat and oil) in a sufficiently dried vessel, adding a catalyst if necessary, and then subjecting the mixture to heating or heating under a reduced pressure. When water generated by polymerization is eliminated from the reaction system, the degree of polymerization of the polyester polyol can be further increased.

In the case where an epoxidized fat and oil is used as the initiator, lactic acid may be subjected to dehydration-condensation polymerization after a denatured fat and oil having the lactic acid is synthesized by an addition reaction of the lactic acid with a fat and oil, or polylactic acid obtained by polymerizing lactic acid alone may be subjected to an addition reaction with a fat and oil.

In the case where the lactic acid is L-lactic acid or D-lactic acid, the mixing ratio of the hydroxylated fat and oil that functions as the initiator to the lactic acid is preferably approximately 1/100 or less, and more preferably 1/20 or less, in terms of molar ratio (fat and oil/lactic acid). The weight ratio is such that the lactic acid is contained in a ratio of 200 parts by weight or less, with respect to 100 parts by weight of the initiator. As described in the case of the lactide, if the lactic acid is contained in a ratio of more than 200 parts by weight, polylactic acid chains that are branched become long, the characteristics of polylactic acid tend to be exhibited, so that the crystallinity increases. If the crystallinity increases, the melting point becomes higher, and thus working properties in various aspects becomes poor. There are problems, for example, in that the crystallinity is high, the miscibility with a solvent or another compound is poor, the melting point is high, and heating is necessary for melting.

In this case, the L-lactic acid or D-lactic acid may contain each optical isomer as impurities, but the optical purity may be 84 mol % or more.

In the case where the lactic acid is in DL-form (racemic form), the mixing ratio of the lactic acid to the hydroxylated fat and oil that functions as the initiator is such that the lactic acid is contained in a ratio of preferably 940 parts by weight or less, more preferably 430 parts by weight or less, with respect to 100 parts by weight of the initiator. In the case where the lactic acid is in DL-form, since the crystallinity of the polylactic acid chains that are branched is originally low, even if the lactic acid is contained in a ratio of 940 parts by weight with respect to 100 parts by weight of the initiator, the resulting polyester polyol has no melting point. However, if the lactic acid is contained in a ratio of more than 940 parts by weight with respect to 100 parts by weight of the initiator, then the molecular weight of the resulting polyester polyol also increases. Thus, the number of hydroxyl groups per molecule (hydroxyl value) becomes small, and this polyester polyol may not be suitable for applications such as a raw material for polyurethane, in which the characteristics of a polyol are required. Furthermore, if the lactic acid is contained in a ratio of more than 430 parts by weight, then the molecular weight of the resulting polyester polyol is more than 4000, soft segments that constitute polyurethane molecules become longer, so that the hardness of the resulting polyurethane may be lowered.

In the case where the lactic acid is L-lactic acid or D-lactic acid, the mixing ratio of the epoxidized fat and oil that functions as the initiator to the lactic acid is preferably approximately 1/100 or less, more preferably 1/42 or less, in terms of molar ratio (fat and oil/lactic acid). The weight ratio is such that the lactic acid is contained in a ratio of preferably 950 parts by weight or less, more preferably 400 parts by weight or less with respect to 100 parts by weight of the initiator. If the lactic acid is contained in a ratio of more than 950 parts by weight, the polylactic acid chains that are branched become long, the characteristics of polylactic acid tend to be exhibited, so that the crystallinity increases. If the crystallinity increases, the melting point becomes higher, and thus working properties in various aspects becomes poor. There are problems, for example, in that the crystallinity is high, the miscibility with a solvent or another compound is poor, the melting point is high, and heating is necessary for melting. Furthermore, if the lactic acid is contained in a ratio of more than 950 parts by weight, the molecular weight of the resulting polyester polyol also increases. Thus, the number of hydroxyl groups per molecule (hydroxyl value) becomes small, and this polyester polyol may not be suitable for applications such as a raw material for polyurethane, in which the characteristics of a polyol are required. Furthermore, the lactic acid is contained in a ratio of more than 400 parts by weight, the molecular weight of the resulting polyester polyol is more than 4000, soft segments that constitute polyurethane molecules become longer, so that the hardness of the resulting polyurethane may be lowered.

In this case, the L-lactic acid or D-lactic acid may contain each optical isomer as impurities, but the optical purity may be 84 mol % or more.

In the case where the lactic acid is in DL-form, the mixing ratio of the lactic acid to the epoxidized fat and oil that functions as the initiator is such that the lactic acid is contained in a ratio of preferably 950 parts by weight or less, more preferably 400 parts by weight or less, with respect to 100 parts by weight of the initiator. In the case where the lactic acid is in DL-form, since the crystallinity of the polylactic acid chains that are branched is originally low, even if the lactic acid is contained in a ratio of 950 parts by weight with respect to 100 parts by weight of the initiator, the resulting polyester polyol has no melting point. However, if the lactic acid is contained in a ratio of more than 950 parts by weight with respect to 100 parts by weight of the initiator, then the molecular weight of the resulting polyester polyol also increases. Thus, the number of hydroxyl groups per molecule (hydroxyl value) becomes small, and this polyester polyol may not be suitable for applications such as a raw material for polyurethane, in which the characteristics of a polyol are required. Furthermore, if the lactic acid is contained in a ratio of more than 400 parts by weight, the molecular weight of the resulting polyester polyol is more than 4000, soft segments that constitute polyurethane molecules become longer, so that the hardness of the resulting polyurethane may be lowered.

In the case of solution polymerization using a solvent, the temperature of the polymerization reaction may be in the range from the azeotropic point of the solvent and dehydrated water to the boiling point of each solvent. However, since fat and oil components are more likely to be denatured as the temperature is higher, heating is performed preferably at 200° C. or lower. For example, castor oil is degraded at 200° C. or higher. In order to cause dehydration, heating is performed preferably at the azeotropic point or higher (e.g., preferably 90 to 180° C.) for a period of time (e.g., 1 to 24 hours) that is suitable for attaining an appropriate degree of polymerization.

In the case of polymerization with heating under a reduced pressure, lactide may be produced by a depolymerization reaction of a lactic acid oligomer in the course of the polymerization of the lactic acid. The lactide exists as impurities in the case of the polymerization of the lactic acid. The lactide is more likely to be produced as the temperature is higher or as the degree of vacuum is higher. The produced lactide is lost by sublimation from the system, thereby reducing the yield of polylactic acid chains. Thus, it is preferable that heating is performed at a temperature of 100 to 180° C. and that the pressure is reduced to 670 to 13000 Pa. If the pressure is more than 13000 Pa, the water content in the reaction system is high, so that it is difficult for the condensation to progress. If the pressure is less than 670 Pa, lactide production and sublimation tend to occur, so that the yield of the product to be recovered is reduced.

As a catalyst in polymerization of the lactic acid, it is possible to use catalysts usually used by a person skilled in the art. Specific examples of the catalyst include tin dichloride ($SnCl_2$), tin 2-ethylhexanoate, tetraphenyltin, tin oxide, sulfuric acid, tin powder, and toluenesulfonic acid.

Polymerization can be performed without a catalyst, although the polymerization reaction rate decreases. In particular, in the case where a polyester polyol having a relatively low molecular weight is produced, since the mixing ratio of the lactic acid with respect to the initiator is small, a catalyst is not always necessary.

As a method for eliminating water from the reaction system, it is possible to use methods usually used by a person skilled in the art. For example, water is removed from the reaction system by azeotropy with a solvent. Examples of a solvent that can be subjected to azeotropy with water include toluene, xylene, mesitylene, ethylbenzene, and mineral spirit. When heating is performed at the azeotropic point or higher with water in these solvents, water can evaporate out of the reaction system, and the dehydration-condensation of the lactic acid can be facilitated.

Furthermore, since all of the above-mentioned solvents, toluene, xylene, mesitylene, ethylbenzene, and mineral spirit, have a specific gravity of less than 1, they can be separated from water based on their specific gravity. When heating is performed together with water at the azeotropic point or higher, an azeotrope of water and the solvent is distilled. This distillate is cooled down to obtain a condensate. Since there is a difference in specific gravity between the solvent and water, this condensate is separated into water and the solvent. Accordingly, the separated water can be removed. Moreover, the solvent can be recovered and circulated in the reaction system for reuse.

More specifically, an azeotrope of water and the solvent is distilled from a heating reaction tank by heating. This distillate is condensed in a cooling tube, guided to a water separator, and separated into water in the lower layer and the solvent in the upper layer based on the difference in specific gravity. For this purpose, the heating reaction tank provided with a steam discharge opening preferably includes a cooling tube and a water separator such as a decanter or Dean-Stark trap. The water separator can remove water in the lower layer from the system, and reflux the solvent in the upper layer for circulation in the heating reaction tank. Accordingly, water can be removed from the condensation reaction system of the lactic acid, without consumption or leakage of the solvent.

Production of Polyester Polyol from Lactic Acid Fermentation Liquor

The lactic acid that is the raw material in the present invention may be produced by chemical synthesis, but in many cases, is produced by lactic fermentation using lactic acid bacteria. Thus, the lactic acid can be obtained as a lactic acid fermentation liquor.

A lactic acid fermentation liquor refers to an aqueous liquid containing lactic acid produced from a carbon source such as glucose that can be assimilated in lactic fermentation using microorganisms such as lactic acid bacteria. A lactic acid fermentation liquor may contain bacteria such as lactic acid bacteria, lactic acid produced by fermentation, a carbon source such as glucose that has not been assimilated yet, by-products (acetic acid, formic acid, etc.), and medium components such as nutrients for the bacteria, and the like. The medium components that are required vary depending on the type of bacteria, but they include organic components such as amino acids, peptides, vitamins, nucleotides, and surfactant, and inorganic components such as salts of phosphoric acid, sulfuric acid, acetic acid, and citric acid. For example, an MRS (de Man-Rogosa-Sharpe) medium, which is a typical medium for *lactobacillus*, contains peptone, meat extract, yeast extract, potassium phosphate, diammonium citrate, sodium acetate, magnesium sulfate, manganese sulfate, and surfactant. An M17 medium, which is a typical medium for *streptococcus*, contains tryptone, soy peptone, Lab-Lemco powder, yeast extract, ascorbic acid, magnesium sulfate, and disodium glycerophosphate. Accordingly, the lactic acid fermentation liquor is a mixed liquid that contains not only lactic acid but also many other solutes, and usually is colored yellow to brown. In this lactic acid fermentation liquor, the concentration of the lactic acid may be usually approximately 10 to 150 g/L.

In the production of the polyester polyol of the present invention, the lactic acid fermentation liquor may be used without any treatment, or a lactic acid fermentation liquor in which cells of microorganisms have been removed in advance may be used. Since cells are insoluble in water, the cells can be removed by allowing the lactic acid fermentation liquor to stand, and then collecting the supernatant. Furthermore, the cells can be removed also by centrifugation or filtering.

In the production of the polyester polyol of the present invention, the polyester polyol of the present invention can be obtained by adding a hydroxylated fat and oil or epoxidized fat and oil as the initiator to a lactic acid fermentation liquor to perform dehydration polycondensation, and then collecting an oil. While the polyester polyol of the present invention is water-insoluble and has a specific gravity of less than 1, the other components contained in the fermentation liquor are water-soluble. Thus, the resultant polyester polyol can be easily obtained by collecting the oil of the upper layer.

Moreover, in the case where the other components contained in the lactic acid fermentation liquor are in a solid form at room temperature, these components are precipitated and dried on the bottom face or wall face of the reaction vessel during dehydration polycondensation. Thus, after the dehydration polycondensation, by adding water to the dried material obtained through drying to dissolve in water, these components can be separated from the oil of the upper layer. At that time, even if there is some water-insoluble matter such as lactic acid bacteria, this matter has a specific gravity of more than 1 and settles out in the reaction vessel, so that there is no need to perform separation in advance.

Production of Polyurethane

Polyurethane (including polyurethane foams) can be produced by reacting the above-described polyester polyol and polyisocyanate, if necessary, in the presence of another active hydrogen compound, a catalyst, a foaming agent, a crosslinking agent, a hardening accelerator, a light stabilizer, a plasticizer, an antioxidant, a heat stabilizer, a filler, a coloring preventing agent, a pigment, an additive, or the like.

As a polyisocyanate used in the present invention, it is possible to use any type of polyisocyanate usually used for producing polyurethane. These types of polyisocyanate may be used alone or in a combination of two or more. Alternately, modified forms thereof such as the isocyanurate-modified form, prepolymer-modified form, or uretodione-modified form may be used, or a plurality of types of polyisocyanate or their modified forms may be used in combination. Examples of aliphatic polyisocyanates include 1,6-diisocyanatohexane (HDI). Examples of alicyclic polyisocyanates include 2,5- or 2,6-bisisocyanatomethyl-bicyclo[2.2.1]heptane (NBDI), and 3,3,5-trimethyl-1-isocyanato-5-isocyanatomethylcyclohexane (IPDI). Specific examples of compounds in which at least two isocyanate groups are directly bonded to aromatics include 4,4'-diphenylmethane diisocyanate (4,4'-MDI), 2,4'-diphenylmethane diisocyanate (2,4'-MDI), 2,4-toluene diisocyanate (2,4-TDI), 2,6-toluene diisocyanate (2,6-TDI), a dimer, trimer, or polymer thereof, a mixture thereof such as crude TDI and crude MDI, and a mixture thereof.

As the catalyst, it is possible to use any catalyst usually used for producing polyurethane by a person skilled in the art. Examples thereof include: amine compounds, for example, trimethylamino-ethylpiperazine, triethylamine, tripropylamine, N-methylmorpholine, N-ethylmorpholine, triethylenediamine, tetramethylhexamethylene-diamine, dimethylcyclohexylamine, diazobicycloundecene, triazines such as 1,3,5-tris(dimethylaminopropyl) hexahydro-s-triazine, and aziridines such as 2-ethylaziridine; quaternary ammonium compounds such as carboxylic acid salts of tertiary amines; alkali metal salts of allyl glycidyl ether, polyalkylene glycol diglycidyl ether, styrene oxide, and the like; lead compounds such as lead naphthenate and lead octoate; tin compounds such as dibutyltin diacetate and dibutyltin dilaurate; alcoholate compounds such as sodium methoxide; phenolate compounds such as potassium phenoxide; metal halides such as iron chloride, zinc chloride, zinc bromide, and tin chloride; and metal complex compounds such as acetylacetone metal salts. These catalysts may be used alone or in a combination of two or more. The amount of the catalyst used is preferably 0.001 to 15 parts by weight with respect to 100 parts by weight of the polyol.

In the present invention, when producing polyurethane foams, a foaming agent may be used. As the foaming agent, it is possible to use foaming agents usually used for producing polyurethane foams by a person skilled in the art. Examples thereof include water, carbon dioxide, hydrocarbons, hydrochlorofluorocarbons, hydrofluorocarbons, and hydrofluoroethers. Foaming agents such as water and carbon dioxide are preferably used in view of their low environmental load. Water is used as a foaming agent because it reacts with polyisocyanate to form carbon dioxide. These foaming agents may be used alone or in a combination of two or more. For example, water and carbon dioxide, water and low-boiling hydrocarbons such as methane, ethane, propane, pentane, isopentane, or cyclopentane, and water and a halogenated hydrocarbon may be used in combination. The amount of these foaming agents used is preferably 0.5 to 10 parts by weight, more preferably 2 to 8 parts by weight, with respect to 100 parts by weight of the polyester polyol.

In production of polyurethane foams, a foam control agent may be used. As the foam control agent, it is possible to use a silicon-containing organic surfactant usually used by a person skilled in the art. The amount of the foam control agent used is preferably 0.01 to 10 parts by weight with respect to 100 parts by weight of the sum of the polyester polyol and the organic polyisocyanate.

In the production of the polyurethane, if necessary, a solvent may be used. Examples of the solvent include, but are not particularly limited to, water, benzene, toluene, xylene, mesitylene, chlorobenzene, o-dichlorobenzene, methylene chloride, chloroform, carbon tetrachloride, dichloroethane, trichloroethane, trichloroethylene, tetrachloroethane, tetrachloroethylene, tetrahydrofuran, 1,4-dioxane, N,N-dimethylformamide, N,N-dimethylacetamide, N-methyl-2-pyrrolidone, 1,3-dimethyl-2-imidazolidinone, dimethyl sulfoxide, and sulfolane.

There is no particular limitation on the reaction temperature because it depends on the type or other properties of the polyester polyol to be used and the resulting polyurethane. In the absence of a solvent, since the reaction is usually performed under melting conditions, the reaction temperature is in the range from room temperature to 200° C. Furthermore, in the presence of a solvent, the reaction is usually performed at a temperature in the range from room temperature to the boiling point of the solvent.

Polyurethane

The polyurethane of the present invention is not only strong but also elastic and flexible, as a resin derived from recycled resources. Thus, this polyurethane can be used in various applications. Accordingly, the polyurethane of the present invention can be typically processed to form, for example, polyurethane elastic bodies such as polymer films, polymer sheets, and tubes; polyurethane foams; and polyurethane fibers. Examples of specific applications include short fibers, long fibers, nonwoven fabrics, porous base materials, defecation bags, garbage bags, sandbags, hot insulation cases, food trays, wrap films, chopsticks, spoons, forks, cups, sponges, bottles, water-absorbent sheets, moisturizing sheets, mulching films for agriculture, base materials for disk cases, polymer staple fibers, card base materials, blister packages, filters for cigarette smoke, coating agents for paper and the like, laminated materials, rods for blocking lacrimal ducts, paper-strengthening agents, microcapsules for heat-sensitive paper or pressure-sensitive paper, medical microcapsules, sustained-release formulations, microcapsules for fertilizers or soil conditioners, suture threads, suture thread clips, injection syringes, disposable clothes, surgical tools, composite semipermeable membranes, supports for treating broken bones or the like or bone-setting materials, transplant orthosis or grafts, fishing lines, fishing nets, lures, cinerary urns, nail polishers, bath pumice, gardening tools, deodorant microcapsules or vessels and packages, flavoring agent microcapsules or vessels and packages, shrink films for labels, adhesives, hot melt adhesives, recycled paper containers, packing bands, adhesive tapes, cushioning materials, coin package films, coating masking films, or eyeglass frames. The polyurethane of the present invention can be used in various applications as described above, utilizing its degradability and, in particular, its excellent properties as a biodegradable polymer.

EXAMPLES

Hereinafter, the present invention will be specifically described by way of examples, but the scope of the present invention is not limited to these examples.

Example 1

First, 100 parts by weight of castor oil (manufactured by Wako Pure Chemical Industries, Ltd.) and L-lactide (manufactured by TOKYO CHEMICAL INDUSTRY CO., LTD.) in the amounts listed in Table 1 were mixed, and heated at 130° C. for 24 hours under an argon atmosphere using tin 2-ethylhexanoate as a catalyst to give polymers, respectively. Each of the obtained polymers was subjected to $H^1$-NMR measurement to confirm the structure thereof. In all polymers, peaks derived from methine adjacent to the hydroxyl groups of the castor oil had been lost, thereby confirming that star-branched polyester polyol in which the hydroxyl groups of the castor oil functioned as origins of polymerization was synthesized. With $H^1$-NMR, the molecular weight of the obtained polyester polyol was also obtained. Furthermore, the obtained polyester polyol was subjected to differential scanning calorimetry (DSC measurement). These results are shown in Table 1.

TABLE 1

| Initiator | L-Lactide | Average molecular weight of product | | DSC measured value of product | | |
|---|---|---|---|---|---|---|
| | | Calculated value | Measured value | Glass transition temperature (° C.) | Melting point (° C.) | Degree of crystallinity (%) |
| Castor oil 100 parts by weight | 150 parts by weight | 2,300 | 2,400 | −22 | — | — |
| | 300 parts by weight | 3,700 | 3,800 | 6 | 87 | 24 |
| | 750 parts by weight | 8,100 | 7,000 | 23 | 138 | 33 |

When polymerization was performed while changing the weight ratio between the lactide and the castor oil, it was found that, as the ratio of the initiator decreased, the molecular weight of the polyester polyol increased. Furthermore, the molecular weight obtained by $H^1$-NMR agreed well with the molecular weight calculated based on the mixing ratio. Thus, it was found that no polylactic acid homopolymer was produced, and that only polyester polyol in which the castor oil functioned as the initiator was obtained.

Furthermore, as the ratio of the lactide became smaller, all of the glass transition temperature, the melting point, and the degree of crystallinity were lowered. In particular, in the case where 150 parts by weight of the lactide was mixed with respect to 100 parts by weight of the initiator, it was found that the crystallinity of the obtained polyester polyol was lost, and that there was no melting point.

Example 2

First, 100 parts by weight of polycastor oil (manufactured by Itoh Oil Chemicals Co., Ltd.) and L-lactide in the amounts listed in Table 2 were mixed, and heated at 130° C. for 24 hours under an argon atmosphere using tin 2-ethylhexanoate as a catalyst to give polymers, respectively. Each of the obtained polymers was subjected to $H^1$-NMR measurement to confirm the structure thereof. In all polymers, peaks derived from methine adjacent to the hydroxyl groups of the polycastor oil had been lost, thereby confirming that star-branched polyester polyol in which the hydroxyl groups of the polycastor oil functioned as origins of polymerization was synthesized. With $H^1$-NMR, the molecular weight of the obtained polyester polyol was also obtained. Furthermore, the obtained polyester polyol was subjected to differential scanning calorimetry (DSC measurement). These results are shown in Table 2.

TABLE 2

| Initiator | L-Lactide | Average molecular weight of product | | DSC measured value of product | | |
|---|---|---|---|---|---|---|
| | | Calculated value | Measured value | Glass transition temperature (° C.) | Melting point (° C.) | Degree of crystallinity (%) |
| Polycastor oil 100 parts by weight | 150 parts by weight | 3,100 | 3,000 | −22 | — | — |
| | 300 parts by weight | 4,500 | 4,400 | 6 | 92 | 1 |
| | 750 parts by weight | 8,900 | 8,300 | 14 | 126 | 11 |

When polymerization was performed while changing the weight ratio between the lactide and the polycastor oil, it was found that, as the ratio of the initiator decreased, the molecular weight of the polyester polyol increased. Furthermore, the molecular weight obtained by $H^1$-NMR agreed well with the molecular weight calculated based on the mixing ratio. Thus, it was found that no polylactic acid homopolymer was produced, and that only polyester polyol in which the polycastor oil functioned as the initiator was obtained.

Furthermore, as the ratio of the lactide became smaller, all of the glass transition temperature, the melting point, and the degree of crystallinity were lowered. In particular, in the case where 150 parts by weight of the lactide was mixed with respect to 100 parts by weight of the initiator, it was found that crystallinity was lost, and that there was no melting point. In comparison with the case of the castor oil (Example 1 above), it was found that, in the case where polycastor oil having a large number of hydroxyl groups was used as the initiator, there was no significant difference in glass transition temperature and melting point, but crystallinity was lowered. The reason for this seems to be that, since the number of origins (hydroxyl groups) in the initiator increased, polylactic acid chains from the respective origins became shorter.

Example 3

First, 100 parts by weight of polycastor oil and DL-lactide (manufactured by TOKYO CHEMICAL INDUSTRY CO., LTD.) were mixed in the amounts listed in Table 3, heated at 130° C. for 24 hours under an argon atmosphere using tin 2-ethylhexanoate as a catalyst to give polymers, respectively. Each of the obtained polymers was subjected to $H^1$-NMR measurement to confirm the structure thereof. In all polymers, peaks derived from methine adjacent to the hydroxyl groups of the polycastor oil had been lost, thereby confirming that star-branched polyester polyol in which the hydroxyl groups of the polycastor oil functioned as origins was synthesized. With $H^1$-NMR, the molecular weight of the obtained polyester polyol was also obtained. Furthermore, the obtained polyester polyol was subjected to DSC measurement. These results are shown in Table 3.

TABLE 3

| Initiator | DL-Lactide | Average molecular weight of product | | DSC measured value of product | | |
|---|---|---|---|---|---|---|
| | | Calculated value | Measured value | Glass transition temperature (° C.) | Melting point (° C.) | Degree of crystallinity (%) |
| Polycastor oil 100 parts by weight | 150 parts by weight | 3,100 | 2,800 | −23 | — | — |
| | 300 parts by weight | 4,500 | 5,400 | 2 | — | — |
| | 750 parts by weight | 8,900 | 9,500 | 14 | — | — |

When polymerization was performed while changing the weight ratio between the lactide and the polycastor oil, it was found that, as the ratio of the initiator decreased, the molecular weight of the polyester polyol increased. Furthermore, the molecular weight obtained by $H^1$-NMR agreed well with the molecular weight calculated based on the mixing ratio. Thus, it was found that no polylactic acid homopolymer was produced, and that only polyester polyol in which the polycastor oil functioned as the initiator was obtained.

Furthermore, as the ratio of the lactide became smaller, the glass transition temperature was lowered. Crystallinity was lost in all mixing ratios, and there was no melting point. Accordingly, it was found that, in the case of the polyester polyol synthesized using DL-lactide, crystallinity was lost regardless of the mixing ratio.

Example 4

First, 100 parts by weight of castor oil and L-lactic acid (manufactured by Wako Pure Chemical Industries, Ltd.) in the amounts listed in Table 4 were mixed, heated to 130° C., and kept under atmospheric pressure for 2 hours, under a reduced pressure of 13000 Pa for 2 hours, under a reduced pressure of 4000 Pa for 2 hours, and then under a reduced pressure of 2600 Pa for 2 hours. Then, while the pressure was kept at a reduced pressure of 2600 Pa, the mixture was heated at 160° C. for 4 hours. The obtained polyester polyol was subjected to gel permeation chromatography (GPC) to confirm the molecular weight of the products. These results are shown in Table 4.

TABLE 4

| Initiator | L-Lactic acid | Average molecular weight of product | |
|---|---|---|---|
| | | Calculated value | Measured value |
| Castor oil 100 parts by weight | 100 parts by weight | 1,600 | 2,300 |
| | 200 parts by weight | 2,300 | 2,300 |
| | 300 parts by weight | 3,000 | 2,600 |

It was confirmed that star-branched polyester polyol in which the lactic acid was polymerized using castor oil as the origin was produced.

Furthermore, the polyester polyol that was synthesized from 100 parts by weight of castor oil and 300 parts by weight of L-lactic acid was subjected to DSC measurement. As a result, there was no melting point, and the glass transition temperature was −27.7° C. While polylactic acid having a molecular weight of approximately 3000 has a melting point of approximately 130° C. and a glass transition temperature of approximately 50° C., the polyester polyol of the present invention was amorphous although it had a similar molecular weight.

Example 5

First, 100 parts by weight of polycastor oil and 200 parts by weight of L-lactic acid were mixed, then tin and toluenesulfonic acid were added thereto as a catalyst. The mixture was heated to 150° C., and kept under atmospheric pressure for 2 hours, under a reduced pressure of 13000 Pa for 2 hours, and then under a reduced pressure of 4000 Pa for 2 hours to give polyester polyol. The obtained polyester polyol was subjected to GPC to confirm the molecular weight of the product. These results are shown in Table 5.

TABLE 5

| Initiator | L-Lactic acid | Average molecular weight of product | |
|---|---|---|---|
| | | Calculated value | Measured value |
| Polycastor oil 100 parts by weight | 200 parts by weight | 3,300 | 3,000 |

It was confirmed that star-branched polyester polyol in which the lactic acid was polymerized by dehydration-condensation using polycastor oil as the origin was produced. Furthermore, when the obtained polyester polyol was subjected to DSC measurement, there was no melting point confirmed. While polylactic acid having a molecular weight of approximately 3000 has a melting point of approximately 130° C., the polyester polyol of the present invention was amorphous although it had a similar molecular weight.

Example 6

First, 100 parts by weight of castor oil and 150 parts by weight of L-lactide were mixed, tin 2-ethylhexanoate was added thereto as a catalyst under an argon atmosphere, and the mixture was heated at 130° C. for 24 hours. Then, 7.5 parts by weight of water as a foaming agent, 2.5 parts by weight of a silicon foam control agent (SZ-1919: manufactured by Nippon Unicar Company Limited), and 0.5 parts by weight of an amine catalyst (DABCO: manufactured by Sankyo Air Products Co., Ltd.) were added to the obtained star-branched polyester polyol, and the resultant was mixed and stirred. Then, 2,4-tolylene diisocyanate (manufactured by Wako Pure Chemical Industries, Ltd.) in an amount of 40 parts by weight, which was an excess amount, was added, the mixture was quickly stirred to give a polyurethane foam. The obtained polyurethane foam had a higher foaming ratio than conventional polyurethane foams synthesized using a castor oil as the polyol. Accordingly, it was found that flexible and rigid polyurethane foam was obtained by using star-branched polyester polyol.

Example 7

First, 300 parts by weight of L-lactic acid (manufactured by Wako Pure Chemical Industries, Ltd., 90 v/v % aqueous solution) was dried under a reduced pressure at 50° C. to dehydrate, and then 100 parts by weight of epoxidized soybean oil (manufactured by ADEKA CORPORATION) was mixed therewith. The mixture was heated to 150° C. while sufficiently stirring, and kept under atmospheric pressure for 5 hours, under a reduced pressure of 13000 Pa for 2 hours, under a reduced pressure of 4000 Pa for 2 hours, under a reduced pressure of 2600 Pa for 2 hours, and then under a reduced pressure of 1300 Pa for 2 hours. The obtained polyester polyol was subjected to GPC to confirm the molecular weight of the product. Furthermore, the obtained polyester polyol was subjected to DSC measurement.

The peak top molecular weight (Mp) of this polyester polyol was 3500, which was very close to the calculated molecular weight of 3400. Accordingly, it was confirmed that a star-branched polyester polyol in which the lactic acid was polymerized using the epoxidized soybean oil as the origin was produced. Furthermore, there was no melting point, and the glass transition temperature was −5.3° C. While polylactic acid having a molecular weight of approximately 3000 has a melting point of approximately 130° C. and a glass transition temperature of approximately 50° C., the polyester polyol of the present invention was amorphous although it had a similar molecular weight.

Example 8

First, 1050 parts by weight of D-lactic acid (manufactured by PURAC, 90 v/v % aqueous solution) was dried under a reduced pressure at 50° C. to dehydrate, and then 100 parts by weight of epoxidized soybean oil was mixed therewith. The mixture was heated to 150° C. while sufficiently stirring, and kept under atmospheric pressure for 5 hours, under a reduced pressure of 13000 Pa for 2 hours, under a reduced pressure of 4000 Pa for 2 hours, under a reduced pressure of 2600 Pa for 2 hours, and then under a reduced pressure of 1300 Pa for 2 hours. Then, while the pressure was kept at a reduced pressure of 1300 Pa, the mixture was heated at 180° C. for 2 hours. The obtained polyester polyol was subjected to GPC to confirm the molecular weight of the product. Furthermore, the obtained polyester polyol was subjected to DSC measurement.

The peak top molecular weight (Mp) of this polyester polyol was 8000, which was very close to the calculated molecular weight of 8200. Accordingly, it was confirmed that a star-branched polyester polyol in which the lactic acid was polymerized using the epoxidized soybean oil as the origin was produced. Furthermore, the melting point was 30° C., and the degree of crystallinity calculated based on the melting point peak was 10%. While linear polylactic acid having a similar molecular weight has a melting point of approximately 130° C. and a degree of crystallinity of 40%, the polyester polyol of the present invention had a low melting point and high amorphous nature although it had a similar molecular weight.

Example 9

Sulfuric acid was added to a model lactic acid fermentation liquor containing 50 parts by weight of lactic acid (a pH 6 aqueous solution containing lactic acid and an M17 medium) to adjust the pH to 2, and then the mixture was dried under a reduced pressure at 50° C. to dehydrate. Subsequently, 100 parts by weight of epoxidized soybean oil was mixed therewith. The mixture was heated to 150° C. while sufficiently stirring, and kept under atmospheric pressure for 5 hours. The resultant was allowed to stand and cool to room temperature. Subsequently, 300 parts by weight of water was added thereto, the mixture was allowed to stand, and the oily supernatant of two separated layers was collected. Next, a model lactic acid fermentation liquor containing 250 parts by weight of lactic acid (a solution containing lactic acid and an M17 medium) was dried under a reduced pressure at 50° C. to dehydrate, and then the collected oily supernatant was mixed therewith. The mixture was heated to 150° C. while sufficiently stirring, and kept under atmospheric pressure for 1 hour under a reduced pressure of 13000 Pa for 2 hours, under a reduced pressure of 4000 Pa for 2 hours, under a reduced pressure of 2600 Pa for 2 hours, and then under a reduced pressure of 1300 Pa for 2 hours. The resultant was allowed to stand and cool to room temperature. Subsequently, 500 parts by weight of water was added thereto, the mixture was allowed to stand, and the oily supernatant of two separated layers was collected. The oily supernatant was subjected to GPC to measure the molecular weight of the product, thereby confirming that polyester polyol was obtained. Furthermore, the obtained polyester polyol was subjected to DSC measurement.

The peak top molecular weight (Mp) of this polyester polyol was 3200, which was very close to the calculated molecular weight of 3500. Accordingly, it was confirmed that a star-branched polyester polyol in which the lactic acid was polymerized using the epoxidized soybean oil as the origin was produced. Furthermore, there was no melting point, and the glass transition temperature was −7.5° C. While polylactic acid having a molecular weight of approximately 3000 has a melting point of approximately 130° C. and a glass transition temperature of approximately 50° C., the polyester polyol of the present invention was amorphous although it had a similar molecular weight.

Example 10

Sulfuric acid was added to a model lactic acid fermentation liquor containing 300 parts by weight of lactic acid (a pH 6 aqueous solution containing lactic acid and an M17 medium), to adjust the pH to 2. The mixture was dried under a reduced pressure at 50° C. to dehydrate. Subsequently, the mixture was heated to 150° C., and kept under atmospheric pressure for 1 hour, under a reduced pressure of 13000 Pa for 2 hours, under a reduced pressure of 4000 Pa for 2 hours, under a reduced pressure of 2600 Pa for 2 hours, and then under a pressure of 1300 Pa for 2 hours. Then, 100 parts by weight of epoxidized soybean oil was added to the obtained mixture containing polylactic acid, and the resultant was heated while sufficiently stirring at 150° C. for 5 hours. After the resultant was allowed to stand and cool to room temperature, 500 parts by weight of water was added thereto, the mixture was allowed to stand, and the oily supernatant of two separated layers was collected. The oily supernatant was subjected to GPC to measure the molecular weight of the product, thereby confirming that polyester polyol was obtained. Furthermore, the obtained polyester polyol was subjected to DSC measurement.

The average molecular weight (Mn) of this polyester polyol was 2800, which was very close to the calculated molecular weight of 2700. Accordingly, it was confirmed that a star-branched polyester polyol in which polylactic acid chains were added to the epoxidized soybean oil was produced. Furthermore, there was no melting point, and the glass transition temperature was −5° C. While polylactic acid having a molecular weight of approximately 3000 has a melting point of approximately 130° C. and a glass transition temperature of approximately 50° C., the polyester polyol of the present invention was amorphous although it had a similar molecular weight.

Example 11

First, 100 parts by weight of epoxidized soybean oil and 285 parts by weight of dehydrated lactic acid obtained by heating L-lactic acid (manufactured by Wako Pure Chemical Industries, Ltd., 90 v/v % aqueous solution) under a reduced pressure were mixed, tin 2-ethylhexanoate was added thereto as a catalyst under a nitrogen atmosphere, and the mixture was heated at 150° C. for 5 hours. Subsequently, the resultant was kept under a reduced pressure of 13000 Pa for 2 hours, under a reduced pressure of 4000 Pa for 2 hours, and then under a reduced pressure of 2600 Pa for 2 hours, and the pressure was reduced to 1300 Pa. Then, while the pressure was kept at a reduced pressure of 1300 Pa, the resultant was heated at 180° C. for 2 hours. Then, 7.5 parts by weight of water as a foaming agent, 2.5 parts by weight of a silicon foam control agent (SZ-1919: manufactured by Nippon Unicar Company Limited), and 0.5 parts by weight of an amine catalyst (DABCO: manufactured by Sankyo Air Products Co., Ltd.) were added to the obtained star-branched polyester polyol, and the resultant was mixed and stirred. Then, 40 parts by weight of polyisocyanate MR-200 (manufactured by Nippon Polyurethane Industry Co., Ltd.) was added thereto, and the mixture was quickly stirred to give a yellow polyurethane foam. The obtained polyurethane foam was a rigid polyurethane foam.

The polyester polyol of the present invention has low crystallinity and a low melting point, so that its working properties is good when used in various applications such as the raw materials for resins and coatings. Furthermore, since the polyester polyol of the present invention uses polylactic acid chains and fats and oils that are renewable resources, it is highly excellent in view of its effectiveness in protecting the global environment and preventing fossil resources from being depleted. Accordingly, the present invention can be a fundamental technique for producing a low-melting polyol derived from renewable resources, which can be used in various applications such as the raw materials for resins.

The invention claimed is:

1. A polyurethane obtained by reacting a polyester polyol with polyisocyanate,
wherein the polyester polyol is obtained, using at least one fat and oil selected from the group consisting of a castor oil, a polycastor oil, and a hydroxylated soybean oil as an initiator, by either one of steps:
(a) performing ring-opening polymerization of 750 parts by weight or less of DL-lactide with respect to 100 parts by weight of the initiator or 50 mol or less of L- or D-lactide with respect to 1 mol of the initiator; or
(b) performing dehydration-condensation polymerization of 940 parts by weight or less of DL-lactic acid with respect to 100 parts by weight of the initiator or 100 mol or less of L- or D-lactic acid with respect to 1 mol of the initiator.

2. A polyester polyol, which is obtained, using at least one fat and oil selected from the group consisting of an epoxidized soybean oil, an epoxidized palm oil, and an epoxidized linseed oil as an initiator, by either one of steps:
- (c) performing ring-opening polymerization of 760 parts by weight or less of L-, D- or DL-lactide with respect to 100 parts by weight of the initiator; or
- (d) performing dehydration-condensation polymerization of 950 parts by weight or less of L-, D- or DL-lactic acid with respect to 100 parts by weight of the initiator.

3. The polyester polyol of claim 2, wherein the step (d) is (d') adding the lactic acid to the fat and oil to synthesize a denatured fat and oil derived from the lactic acid, then performing dehydration-condensation polymerization of the lactic acid.

4. The polyester polyol of claim 2, wherein the step (d) is a step of obtaining a polylactic acid by polymerizing the lactic acid alone and then adding the polylactic acid to the fat and oil.

5. The polyester polyol of claim 2, which is obtained by the step (d) and a further step (e), wherein in the step (d), the dehydration-condensation polymerization of the lactic acid is performed by heating the fat and oil and a lactic acid fermentation liquor containing the lactic acid under a reduced pressure, and after the step (d), the step (e) of separating and collecting an oil layer from the lactic acid fermentation liquor obtained in the step (d) is performed.

6. The polyester polyol of claim 5, wherein, prior to the step (e), water is added to the lactic acid fermentation liquor obtained in the step (d).

7. A process for producing a polyurethane comprising,
- (i) obtaining a polyester polyol, using at least one fat and oil selected from the group consisting of a castor oil, a polycastor oil, and a hydroxylated soybean oil as an initiator, by either one of steps:
  - (a) performing ring-opening polymerization of 750 parts by weight or less of DL-lactide with respect to 100 parts by weight of the initiator or 50 mol or less of L- or D-lactide with respect to 1 mol of the initiator; or
  - (b) performing dehydration-condensation polymerization of 940 parts by weight or less of DL-lactic acid with respect to 100 parts by weight of the initiator or 100 mol or less of L- or D-lactic acid with respect to 1 mol of the initiator; and
- (ii) reacting the polyester polyol with polyisocyanate.

8. A process for producing a polyester polyol, which comprises, using at least one fat and oil selected from the group consisting of an epoxidized soybean oil, an epoxidized palm oil, and an epoxidized linseed oil as an initiator, by either one of steps:
- (c) performing ring-opening polymerization of 760 parts by weight or less of L-, D- or DL-lactide with respect to 100 parts by weight of the initiator; or
- (d) performing dehydration-condensation polymerization of 950 parts by weight or less of L-, D- or DL-lactic acid with respect to 100 parts by weight of the initiator.

9. The process of claim 8, wherein the step (d) is (d') adding the lactic acid to the fat and oil to synthesize a denatured fat and oil derived from the lactic acid, then performing dehydration-condensation polymerization of the lactic acid.

10. The process of claim 8, wherein the step (d) is a step of obtaining a polylactic acid by polymerizing the lactic acid alone and then adding the polylactic acid to the fat and oil.

11. The process of claim 8, which further comprises a step (e), wherein in step (d), the dehydration-condensation polymerization of the lactic acid is performed by heating the fat and oil and a lactic acid fermentation liquor containing the lactic acid under a reduced pressure, and after the step (d), the step (e) of separating and collecting an oil layer from the lactic acid fermentation liquor obtained in the step (d) is performed.

12. The process of claim 11, wherein prior to the step (e), water is added to the lactic acid fermentation liquor obtained in the step (d).

* * * * *